(12) United States Patent
Beecham et al.

(10) Patent No.: US 6,216,527 B1
(45) Date of Patent: Apr. 17, 2001

(54) METHOD OF VERIFYING VEHICLE EMISSIONS

(75) Inventors: James E. Beecham; John W. Tinker, both of Las Vegas, NV (US)

(73) Assignee: International Fuel Technology, Inc., Las Vegas, NV (US)

( * ) Notice: Subject to any disclaimer, the term of this patent is extended or adjusted under 35 U.S.C. 154(b) by 0 days.

(21) Appl. No.: 09/349,388

(22) Filed: Jul. 9, 1999

(51) Int. Cl.⁷ ................................................. G01M 15/00
(52) U.S. Cl. .......................... 73/23.31; 204/660; 210/222
(58) Field of Search ............................... 73/23.31, 23.32, 73/116, 117.2, 117.3, 118.1; 340/438; 204/660; 210/222

(56) References Cited

U.S. PATENT DOCUMENTS

| | | |
|---|---|---|
| Re. 35,181 | 3/1996 | Hudz . |
| 4,050,426 | 9/1977 | Sanderson . |
| 4,188,296 * | 2/1980 | Fujita ................................... 210/222 |
| 4,326,954 | 4/1982 | Shroyer . |
| 4,334,889 | 6/1982 | Takabayashi . |
| 4,357,237 | 11/1982 | Sanderson . |
| 4,469,076 | 9/1984 | Wolff . |
| 4,538,582 | 9/1985 | Wakuta . |
| 4,611,615 | 9/1986 | Petrovic . |
| 5,059,743 | 10/1991 | Sakuma . |
| 5,127,385 | 7/1992 | Dalupin . |
| 5,159,915 | 11/1992 | Saito et al. . |
| 5,307,779 | 5/1994 | Wood et al. . |
| 5,329,911 | 7/1994 | Jeong . |
| 5,343,906 | 9/1994 | Tibbals, III . |
| 5,359,979 | 11/1994 | Anfinson et al. . |
| 5,487,370 | 1/1996 | Miyazaki . |
| 5,533,490 | 7/1996 | Pascall . |
| 5,829,420 | 11/1998 | Kita et al. . |
| 5,863,404 * | 1/1999 | Fujimaki .............................. 204/660 |

\* cited by examiner

*Primary Examiner*—Eric S. McCall
(74) *Attorney, Agent, or Firm*—William M. Hobby, III

(57) ABSTRACT

A method of verifying vehicle emissions includes the steps of testing a refined fuel for emissions, treating the refined fuel following the testing thereof for emissions, and then testing the treated refined fuel for emissions. The refined fuel measurements are compared with the treated refined fuel measurements to determine reduction in emissions of the fuel. This data is transmitted to a computer. The treated fuel is dispensed to a vehicle, such as a diesel truck, at a fuel dispensing station where the vehicle identification is read from the vehicle and, with the fuel data, is transmitted to the computer where the computer can match the fuel measurement data to the vehicle identification and fuel dispensing information. The process also includes the attaching of an on-board emissions monitor to the exhaust of the vehicle, which monitoring data is stored and transmitted during refueling to the computer with the refueling data. The treatment can include a combination of a magnetic treatment of the fuel while the fuel is passing through a venturi simultaneously while feeding oxygen into the fuel during treatment. Optionally, data determining reductions in emissions from treated fuel combustion in comparison to non-treated fuel combustion in a specific engine is utilized in application for monetary or non-monetary receivables in the form of emission reduction credits or the like.

8 Claims, 2 Drawing Sheets

METHOD OF VERIFYING VEHICLE EMISSIONS

BACKGROUND OF THE INVENTION

The present invention deals with a method of verifying vehicle emissions and especially to a method which tests refined fuel before and after treatment and which monitors the vehicles use of the fuel.

Internal combustion engines are a major source of pollutant gases in the atmosphere. Combustion exhaust includes $NO_2$, nitrogen oxide, called NOX, which enters the atmosphere in varying amounts according to the engine operating conditions. In addition, internal combustion engines can produce varying degrees of carbon monoxide and carbon particles.

In recent years, reduction of emissions has received an increasing amount of attention and there have been a number of relatively low emission alternatives to the internal combustion engine. The internal combustion engine utilizes petroleum based diesel fuel or gasoline which has survived due in part to the ability of engineers to constantly improve emission controls and maintain the internal combustion engine at governmental specified standards. However, to maintain proper emission controls requires maintaining the controls in a state of good repair. As such, an automobile, when it leaves a factory, may meet emission standards but can then change over time such that the bulk of vehicles on the road no longer meet those emission standards. One method employed by municipalities to reduce emissions has been to require periodic inspections that utilize computerized systems to measure the emissions with the result that a validation sticker is provided only to owners of vehicles who pass the tests. If not passed, the owner of a vehicle is given a predetermined amount of time to repair the vehicle and bring it within the standards. This has resulted in improvements in the level of emissions entering the environment from any particular vehicle. Emission systems are, however, relatively easy to tamper with.

Another alternative is the use of an alterative fuel system, such as natural gas and propane which burn cleaner as fuels. Typically, the average consumer does not purchase this type of fuel, and the vehicles that can burn them have difficulty to access the fuels. Also, both the state and federal government have introduced certain incentive plans that provide tax breaks for any organization that can reduce overall emissions with vehicles including tax breaks for reducing the emissions. One plan previously considered for enhancing the fuel for an internal combustion engine has been to pass the fuel through a predetermined magnetic field.

The following U.S. patents all treated fuel with a magnetic field and all place permanent or electromagnets around an existing non-magnetic fuel line to apply the magnetic field to the fuel passing through a fuel line.

The Hudz U.S. Pat. No. RE 35,181, applies a magnetic field to the vaporizer portion of a carburetor for improving the dispersion of the fuel/air mixture entering the internal combustion engine. The Saito et al. U.S. Pat. No. 5,159,915, applies an electromagnetic field with a fluctuating magnetic flux density to a fuel injector. The Wakuta U.S. Pat. No. 4,538,582; Jeong U.S. Pat. No. 5,329,911; Wood et al. U.S. Pat. No. 5,307,779; Anfinson et al. U.S. Pat. No. 5,359,979; and Petrovic U.S. Pat. No. 4,611,615 each attach an apparatus to the fuel line that allows the fuel to pass therethrough while applying a magnetic field to the fuel passing through the fuel line. Magnets are placed for the fuel to pass therearound which also swirl the fuel.

The Sakuma U.S. Pat. No. 5,059,743, is a process for the treatment of hydrocarbon fuel which includes treating the fuel with a very weak magnetic flux density with a larger magnetic density in the south pole than in the north pole. The Shroyer U.S. Pat. No. 4,326,954, is a fuel treating apparatus which treats the fuel including fuels with an electromagnetic field for later use in an engine. The Sanderson U.S. Pat. No. 4,050,426; Sanderson U.S. Pat. No. 4,357,237; Dalupan U.S. Pat. No. 5,127,385; and the Miyazaki U.S. Pat. No. 5,487,370; along with the Pascall U.S. Pat. No. 5,533,490 and Wolff U.S. Pat. No. 4,469,076 each treat fuel by passing the fuel through a magnetic field. The fuel appears to pass through an area of reduced cross-sectional area in the fuel line.

The Takabayashi U.S. Pat. No, 4,334,889, teaches a method of improving the combustibility of gasoline by injecting oxygen gas into gasoline in the stationary or flowing state under a magnetic field to prolong the running time of an internal combustion engine under the same conditions as untreated gasoline. The U.S. Patent to Kita et al., No. 5,829,420, is an electromagnetic device for the magnetic treatment of fuel which senses the emission and uses a microprocessor and electromagnet electrically interconnected in a feedback loop so as to minimize the emission of carbon monoxide and unburned hydrocarbons while maximizing the output of carbon dioxide on an engine.

The Tibbals, III U.S. Pat. No. 5,343,906, is an emission validation system which has a plurality of sensors for monitoring various emissions and diagnostic aspects of a vehicle. An emissions validation system is operable upon refueling through a refueling line to interface to a CPU. The CPU retrieves the stored information and transfers it through the interface through an electrical line to a main CPU in the emission validation system. The main CPU then validates the information in addition to monitoring the amount of fuel that is placed back into the vehicle's tank which allows a complete record of the vehicle history to be maintained.

The present invention deals with a method of verifying vehicle emissions particularly on fleet trucks and the like using a diesel fuel which tests a refined petroleum fuel for emissions before treating the fuel and again, after treating the fuel, and then comparing the before and after measurements to determine reduction in the emissions by the treated fuel. This data is transmitted to a computer and the fuel is dispensed at fuel dispensing stations where a truck being refueled has the data transmitted to the computer along with the identification of the truck. The computer can then match the identification of the truck with the fuel data. The invention also calls for an on-board exhaust emissions measuring device for continuously measuring the exhaust and storing the data for transmission to the computer during refueling.

SUMMARY OF THE INVENTION

A method of verifying vehicle emissions includes the steps of testing a refined fuel for emissions, treating the refined fuel following the testing thereof for emissions, and then testing the treated refined fuel for emissions. The refined fuel measurements are compared with the treated refined fuel measurements to determine reduction in emissions of the fuel. This data is transmitted to a computer. The treated fuel is dispensed to a vehicle, such as a diesel truck, at a fuel dispensing station where the vehicle identification is read from the vehicle and, with the fuel data, is transmitted to the computer where the computer can match the fuel measurement data to the vehicle identification and fuel dispensing information. The process also includes the attaching of an on-board emissions monitor to the exhaust of the vehicle, which monitoring data is stored and transmitted during refueling to the computer with the refueling data. The treatment can include a combination of a magnetic treatment of the fuel while the fuel is passing through a venturi simultaneously while feeding oxygen into the fuel during treatment. Optionally, data determining reductions in emissions from treated fuel combustion in comparison to non-treated fuel combustion in a specific engine is utilized in application for monetary or non-monetary receivables in the form of emission reduction credits or the like.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
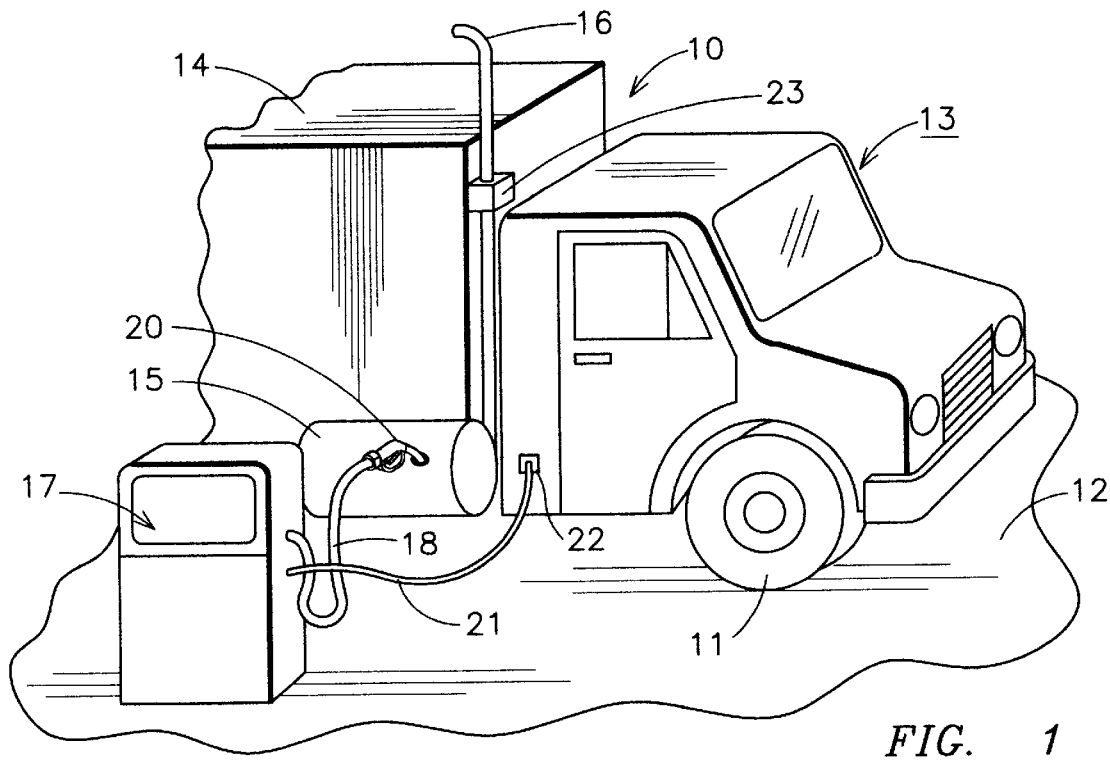
FIG. 1 is a partial perspective of a truck connected to a fuel pump station in accordance with the present invention.

Referring to the drawings, FIG. 1 shows a truck 10 having wheels 11 riding on a surface 12 and having a cab 13 along with a trailer unit 14, a fuel tank 15 and an exhaust pipe 16. A fuel pump station 17 has a fuel line 18 having a nozzle 20 connected to the fuel tank 15 for refueling the truck 10. In addition, a communications line 21 is connected from the fuel pump 17 to a rapid connector 22 for reading data stored on the truck 10 indicating the identity of the particular truck 10. This connector can also read the odometer reading data at each fuel stop. The fuel pump 17 can also transmit the amount of fuel pumped into the tank 15 through the communication line 21. The truck 10 can have an iBUTTON mounted to the side thereof for storing the information on the truck. An iBUTTON is a semi-conductor device which can be attached to the truck for storing truck identification as well as starting odometer readings for each refueling period while a second iBUTTON can be attached to the fuel pump 17 for matching fuel transactions to each truck. An iBUTTON is a computer chip housed in a stainless steel can which can be attached to an object for up-to-date information at the point of use and can house computer memory for storing data. The information stored can be transferred to a desktop computer, laptop, or the like. The iBUTTON is made by Dallas Semiconductor Corp. in Dallas, Tex. The truck 10 can also have exhaust emission measuring circuit 23 attached to the exhaust 16 of the truck for constantly measuring the exhaust emissions which data can also be stored and outputted through the connection 22 to the fuel pump 17.

Figure 3:
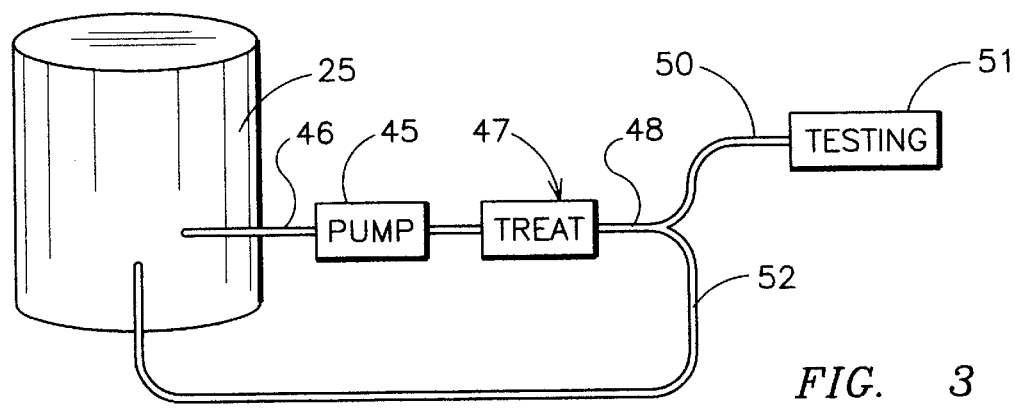
FIG. 3 is a block diagram of the treatment process of the present invention.
Figure 2:
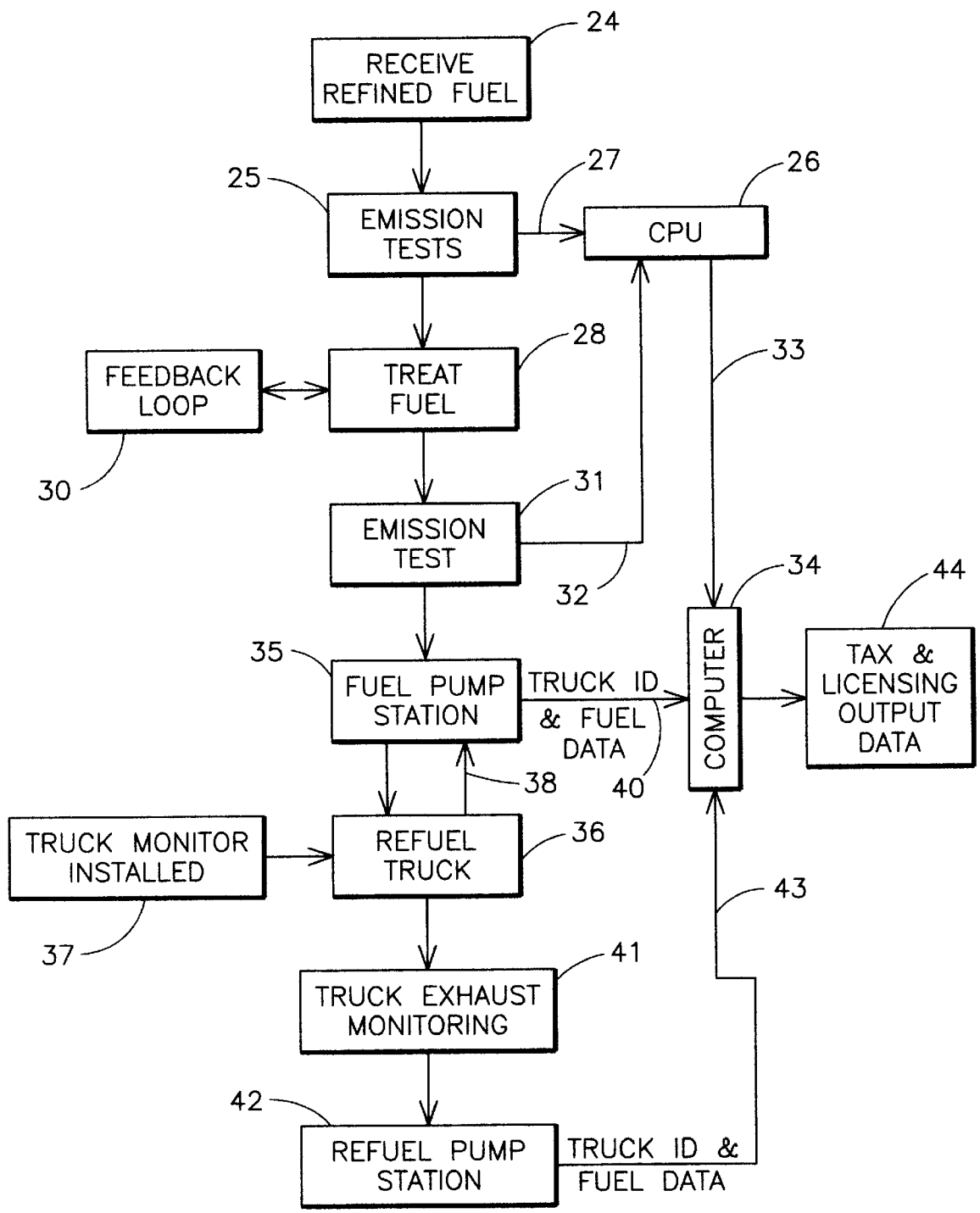
FIG. 2 is a block diagram of the process of the present invention.

FIG. 2 illustrates the overall process of the present invention in which refined petroleum fuel is received at 24 into a storage unit, such as the storage tank 25 of FIG. 3. Emissions tests are run at 25 on the refined fuel received in the tank. The results of the emissions test are coupled to a CPU 26 through a linkage 27 which can be over a hard wire link or can be transmitted over the air. The fuel from the tank 24 is then treated in a fuel treating process at 28 which includes treating the fuel through a feedback loop 30. The treated fuel 28 is subjected to emissions test at 31 and the data from the emissions test is transmitted through a communication link 32 to the CPU 26. The CPU 26 can then store the data and calculate a reduction in emissions per gallon of gasoline or diesel between the fuel before and after treatment. This data is supplied through a communications link 33 to a computer 34 where it can be stored in the computer. The treated fuel 28 is then delivered to a fuel pump station 35 where it can refuel a truck 36. The refueling truck 36 has truck monitoring equipment installed at 37 which can be provided on all trucks of a fleet. The trucks all optionally have the iBUTTONS attached thereto. Attaching the electronic connection between the refueling truck and the fuel pump station at 38 allows the identification of the truck and other information to be read to the fuel pump station 35 and fueling information can be transferred from the pump to the truck iBUTTON. The pump transmits the data at 40 to the computer 34. The transmitted data 40 can include the identification of the truck, the fuel data, such as the amount of fuel added to the truck, and the odometer readings if desired. The computer 34 can then match the data received over the line 40 with the data from the refined fuel and the treated fuel at a central location at the computer 34.

The refueled truck 36 can have on-board monitoring 41 through the truck monitoring equipment 37 installed on the truck being refueled at 36. At the next refueling station 42, the truck will also have data gathered and stored therein as well as the truck ID collected at the fuel pump station and transmitted over a data link 43 to the computer 34. The computer combines the data identified for a particular truck with the fuel test data from the CPU 26 and the truck data in the computer 34 to produce tax and licensing output data 44 for use in obtaining tax reductions on the use of the truck or on the whole fleet moving over the road. This process assures that the actual emission reductions are maintained for all vehicles of a fleet at all times and merely requires that the fuel pump station be electrically connected when refueling a truck of a fleet of trucks. In addition, the date in the computer can then be used to determine reductions in emissions from treated fuel combustion in comparison to non-treated fuel combustion in a specific engine and can be utilized in applications for monetary or non-monetary receivables in the form of emission reduction credits.

Figure 4:
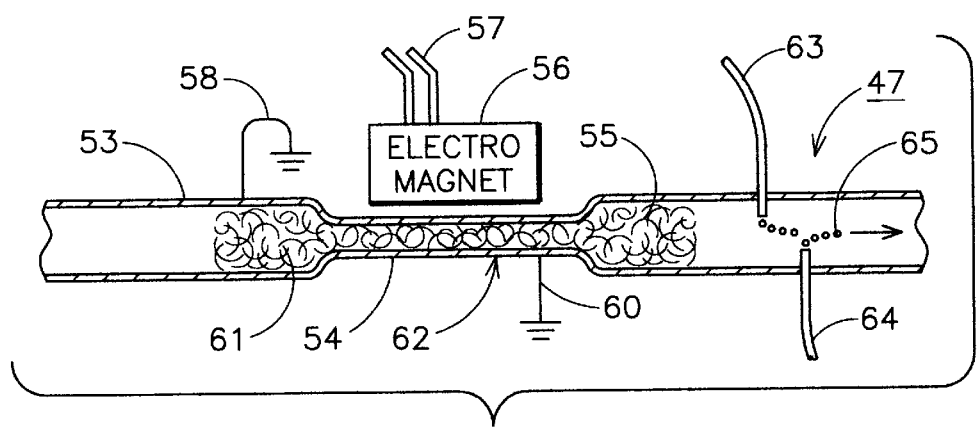
FIG. 4 is a sectional view taken through the treating system of FIG. 3.

Turning to FIGS. 3 and 4, the basic treatment and feedback loop are illustrated having the fuel tank 25 which receives the refined petroleum fuel which is then pumped with the pump 45 through a line 46 to a fuel treating station 47 where the treated fuel is drawn from the fuel line 48 through the fuel line 50 into the testing station 51. The testing station 51 can test for optical density, emissions, NOX, particulates, and viscosity of the fuel but preferably has a small engine which runs continuously and in which emissions and operating output are continuously or intermittently tested. The tests can also be run for optical UV light transmission, viscosity, conductivity and with a calorimeter. The treated fuel is fed through a line 52 back to the storage tank 25.

The treatment system 47 can more clearly be seen in FIG. 4 in which a fuel line 53 has a much narrowed portion 54 becoming enlarged again at 55 to form a venturi 62 in the line. An electromagnet 56 is placed adjacent to the venturi 62 and has power lines 57 connected to a power source. The fuel lines 53, 54, and 55 can be grounded at 58 and 60 and may be filled with a stainless steelwool 61 which forces a roiling motion of the fuel passing through the venturi area 62 where it is being subject to a magnetic field. The line 55 has oxygen lines 63 and 64 coupled to the line 55 and bubbling oxygen 65 into the line 55 adjacent the venturi 62 where the fuel is being subjected to a magnetic field. The treatment process is such that a complex three-dimensional hydrocarbon molecule of a refined hydrocarbon fuel is rendered more planar and has elemental oxygen crossed-linked with the convoluted complex hydrocarbon molecule of the fuel to place the oxygen in proximity to the carbon for subsequent more efficient combustion. Thus, the overall system provides for the treatment of fuel as well as the constant monitoring of the fuel before treatment, after treatment, and in combination with monitoring of the vehicles receiving the fuel for computing the amount of reduction of emissions for tax and licensing purposes. However, the present invention should not be construed as limited to the forms shown which are to be considered illustrative rather than restrictive.

We claim:

1. A method of verifying vehicle emissions comprising the steps of:

testing a refined fuel for emissions;

treating said refined fuel following testing thereof for emissions;

testing said treated refined fuel for emissions;

comparing said refined fuel measurements with said treated refined fuel measurements to determine reduction in emissions in fuel;

transmitting fuel measurement data to a computer;

dispensing treated fuel to said vehicle at a fuel dispensing station;

reading vehicle identification at said fuel dispensing station;

transmitting vehicle identification and fuel dispensed information to said computer; and matching said fuel measurement data to said vehicle identification and fuel dispensed thereinto, whereby emission reduction in a vehicle using a treated fuel can be determined.

2. A method of verifying vehicle emissions in accordance with claim 1 including the step of attaching a fuel emission measuring means to a vehicle exhaust and measuring emissions data in the exhaust of said vehicle with said fuel emission measuring means.

3. A method of verifying vehicle emissions in accordance with claim 2 including the step transmitting said measured emissions data from the exhaust of the vehicle to said computer.

4. A method of verifying vehicle emissions in accordance with claim 3 in which the step of treating refined fuel includes passing said fuel through a magnetic field.

5. A method of verifying vehicle emissions in accordance with claim 4 in which the step of treating refined fuel includes feeding oxygen into said refined fuel being passed through a magnetic field.

6. A method of verifying vehicle emissions in accordance with claim 5 in which the step of treating refined fuel includes passing said fuel through stainless steelwool.

7. A method of verifying vehicle emissions in accordance with claim 6 in which the step of treating refined fuel includes having a fuel line cross-section narrowed adjacent said magnetic field.

8. A method of verifying vehicle emissions in accordance with claim 1 including the step of determining fuel emission reduction credits for an identified vehicle.

* * * * *